(12) United States Patent
Wiseman

(10) Patent No.: US 6,892,127 B2
(45) Date of Patent: May 10, 2005

(54) METHODS AND APPARATUS FOR ASSESSING GAS TURBINE ENGINE DAMAGE

(75) Inventor: Matthew William Wiseman, Fairfield, OH (US)

(73) Assignee: General Electric Company, Schenectady, NY (US)

(*) Notice: Subject to any disclaimer, the term of this patent is extended or adjusted under 35 U.S.C. 154(b) by 100 days.

(21) Appl. No.: 10/376,510

(22) Filed: Feb. 28, 2003

(65) Prior Publication Data

US 2004/0172187 A1 Sep. 2, 2004

(51) Int. Cl.[7] .............................................. G06F 19/00
(52) U.S. Cl. ........................ 701/100; 701/99; 701/29; 60/233; 60/242; 702/182; 702/183; 73/116; 73/117.2
(58) Field of Search ............................... 701/34–35, 99, 701/100, 29; 702/186–187, 81–84, 182–185; 706/15–16, 23–25, 912–915, 20–21, 903–907; 73/112–113, 116, 117.2, 117.3, 118.1, 118.2; 714/25–26, 47–48; 60/236–243, 233, 770–773

(56) References Cited

U.S. PATENT DOCUMENTS

| | | | | |
|---|---|---|---|---|
| 3,747,344 A | * | 7/1973 | Porter et al. ................... | 60/242 |
| 4,176,792 A | | 12/1979 | McCardle, Jr. ........ | 239/265.41 |
| 4,242,864 A | * | 1/1981 | Cornett et al. ............. | 60/226.1 |
| 4,245,787 A | | 1/1981 | Freid ...................... | 239/265.41 |
| 4,891,971 A | | 1/1990 | Jones et al. ................. | 73/117.3 |
| 5,072,580 A | * | 12/1991 | Patterson et al. ............. | 60/242 |
| 5,197,280 A | * | 3/1993 | Carpenter et al. ............. | 60/204 |
| 5,522,546 A | | 6/1996 | Jarvis ..................... | 239/265.19 |
| 5,748,500 A | | 5/1998 | Quentin et al. ............. | 702/182 |
| 6,324,659 B1 | | 11/2001 | Pierro ......................... | 714/48 |
| 6,405,108 B1 | | 6/2002 | Patel et al. .................... | 701/29 |
| 6,408,259 B1 | | 6/2002 | Goebel et al. .............. | 702/183 |
| 6,438,484 B1 | | 8/2002 | Andrew et al. ............. | 701/100 |
| 6,466,858 B1 | | 10/2002 | Adibhatla et al. .......... | 700/100 |
| 6,493,689 B2 | | 12/2002 | Kotoulas et al. .............. | 706/23 |
| 6,625,987 B2 | * | 9/2003 | Pisano et al. ................. | 60/773 |

* cited by examiner

Primary Examiner—Jacques H. Louis-Jacques

(57) ABSTRACT

A method and apparatus for assessing damage to machine components is provided. The method includes calculating an expected parameter value based on a first parameter value indicator, calculating an estimate of an actual parameter value based on a second parameter value indicator, the second parameter value indicator being different than the first parameter value indicator, determining if the calculated expected parameter value is different than the calculated estimate of the actual parameter value by a predefined limit, and generating a damage flag based on a result of the comparison. The apparatus includes a computing device including a processor and a memory communicatively coupled to the processor, the processor programmed to execute a software product code segment that includes a detection boundary module, an estimator, and a comparator wherein the computing device is programmed to assess damage within an engine.

2 Claims, 6 Drawing Sheets

METHODS AND APPARATUS FOR ASSESSING GAS TURBINE ENGINE DAMAGE

STATEMENT REGARDING FEDERALLY SPONSORED RESEARCH OR DEVELOPMENT

The U.S. Government may have certain rights in this invention pursuant to contract number N68936-99-C-0117.

BACKGROUND OF THE INVENTION

This invention relates generally to gas turbine engines and, more particularly, to methods and apparatus for assessing damage to engines.

Gas turbines are used in different environments, such as, for providing propulsion as aircraft engines and/or for generating power in both landbased power systems and/or sea-borne power systems. During normal operation gas turbine engines may experiences large changes in ambient temperature, pressure, and power output level, and although such changes occur during normal operation, such change may result in undesirable changes in engine dynamics.

To facilitate maintaining engine efficiency, at least some known turbine engines include a controller that continuously monitors the engine to ensure that mechanical, aerodynamic, thermal, and flow limitations of the turbo machinery are maintained. However, despite continuous monitoring of the turbine engine, undesirable engine performance may occur without detection by the controller. For example, an erroneous actuator position feedback, or an obstruction in the afterburner duct may cause the variable exhaust nozzle (VEN) of a gas turbine engine to exhibit anomalous behavior that may not be detectable until a physical inspection of the VEN is performed. However, continued operation with the anomalous behavior may adversely effect engine operating performance.

Variable area exhaust nozzles (VEN) on gas turbine engines typically are manipulated to regulate a pressure ratio in the engine. Physically, the pressure drop across the nozzle changes in response to changes in the effective nozzle area, which may affect, for example, a fan operating line, and a core engine pressure ratio. Known VEN control logic can detect position sensor failure or actuator failure, however, more subtle damage scenarios, such as a hole resulting from ballistics damage, would be compensated for by manipulating the VEN position, but the damage is undetected by the control logic unless the needed compensation exceeds the physical limits of the VEN.

BRIEF DESCRIPTION OF THE INVENTION

In one aspect, a method of assessing damage to machine components is provided. The method includes calculating an expected parameter value based on a first parameter value indicator, calculating an estimate of an actual parameter value based on a second parameter value indicator, the second parameter value indicator being different than the first parameter value indicator, determining if the calculated expected parameter value is different than the calculated estimate of the actual parameter value by a predefined limit, and generating a damage flag based on a result of the comparison.

In another aspect, apparatus for detecting damage in a gas turbine engine is provided. The apparatus includes a computing device including a processor and a memory communicatively coupled to the processor, the processor is programmed to execute a software product code segment including a detection boundary module, an estimator, and a comparator wherein the computing device is programmed to assess damage within an engine.

In yet another aspect, a gas turbine assembly is provided. The assembly includes a variable area exhaust nozzle including an inlet side, and an outlet side, and a computing device that includes a processor and a memory communicatively coupled to the processor wherein the processor is programmed to execute a software product code segment that includes a detection boundary module, an estimator, and a comparator, and wherein the computing device is programmed to assess damage within the gas turbine assembly.

DETAILED DESCRIPTION OF THE INVENTION

Figure 1:
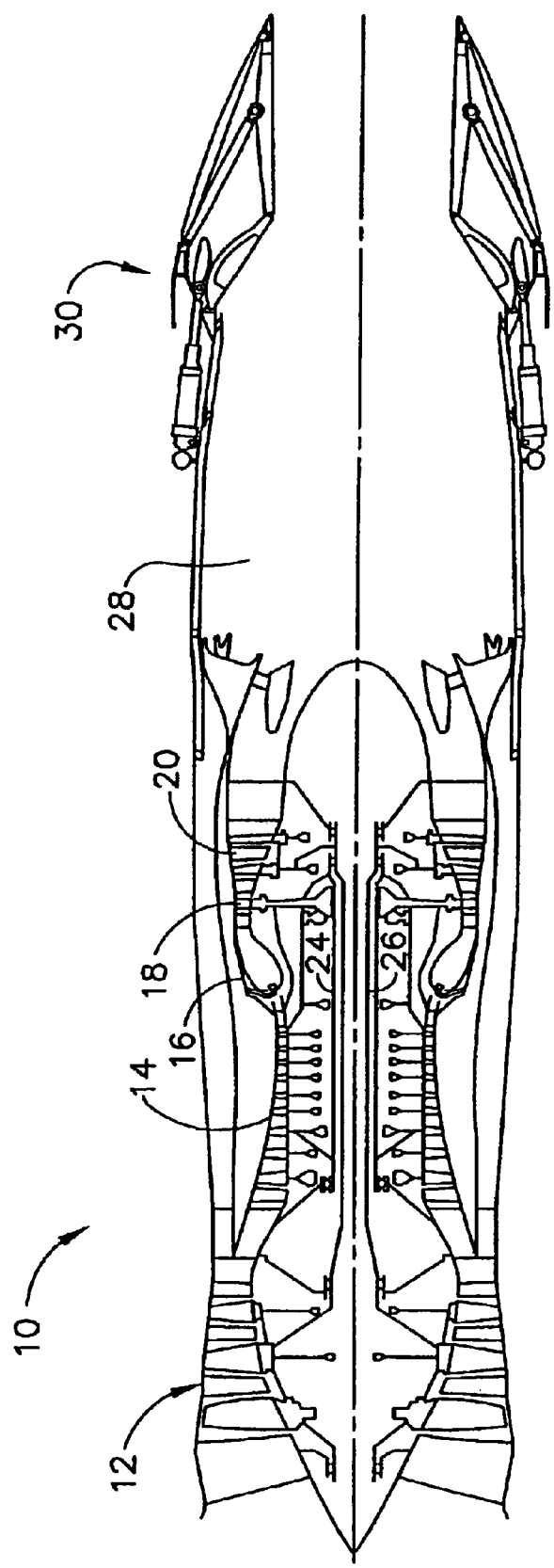
FIG. 1 is a schematic illustration of a gas turbine engine.

FIG. 1 is a schematic illustration of a gas turbine engine 10 including a fan assembly 12, a high pressure compressor 14, and a combustor 16. In one embodiment, engine 10 is a F414 military aircraft engine available from General Electric Company, Cincinnati, Ohio. Engine 10 also includes a high pressure turbine 18 and a low pressure turbine 20. Fan assembly 12 and turbine 20 are coupled by a first shaft 24, and compressor 14 and turbine 18 are coupled by a second shaft 26.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust system 28. Exhaust system 28 includes a variable area exhaust nozzle (VEN) 30.

Figure 2:
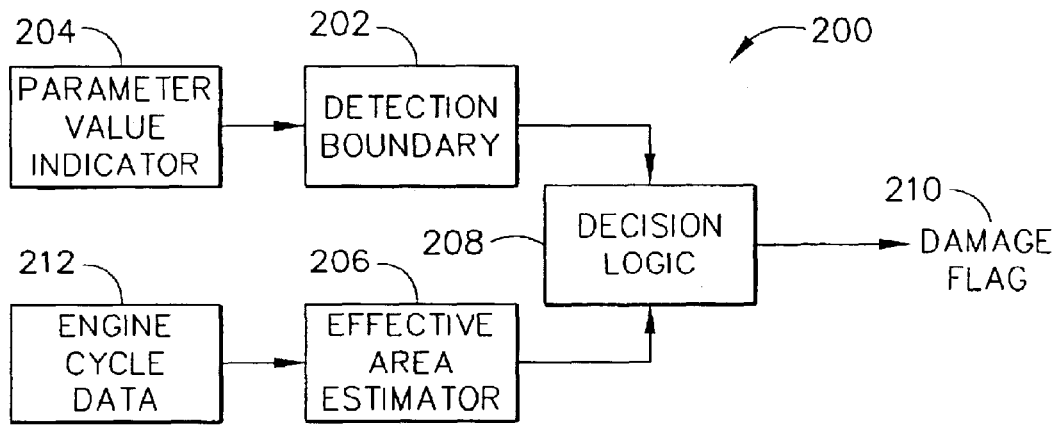
FIG. 2 is an exemplary block diagram of a variable area exhaust nozzle damage detector that may be used with the gas turbine engine shown in FIG. 1.

FIG. 2 is an exemplary block diagram of a variable area exhaust nozzle damage detector 200 that may be used with gas turbine engine 10 shown in FIG. 1. Damage detector 200 may be embodied in a processor coupled to engine 10 and configured to perform the below described processes. As used herein, the term processor is not limited to just those integrated circuits referred to in the art as processors, but broadly refers to computers, processors, microcontrollers, microcomputers, programmable logic controllers, application specific integrated circuits, and other programmable circuits. In the exemplary embodiment, damage detector 200 is embodied in a Full Authority Digital Electronic Control (FADEC) available from General Electric Company, Cincinnati, Ohio. Damage detector 200 is used to identify potential damage cases including holes, or other damage that causes an increase in the physical area downstream of the turbines and/or blockages, or erroneous position feedback signals, or other damage that causes a decreased physical area downstream of the turbines. Damage detector 200 includes a detection boundary module 202 that is communicatively coupled to a parameter value indicator 204. In the exemplary embodiment, gas turbine engine 10 includes VEN 28 and parameter value indicator 204 is a nozzle actuator position feedback 204. In an alternative embodiment, parameter value indicators 204 may include engine process parameters used to infer a nozzle actuator position feedback.

An effective area estimator 206 utilizes engine cycle data to determine a nozzle area implied by engine process parameters that are affected by the actual nozzle area. A comparator 208 receives signals from detection boundary module 202 and estimator 206, and compares the received signals relative to each other and to a predetermined limit. If the comparison result exceeds a pre-defined limit value, a damage flag 210 is generated. In the exemplary embodiment, a maximum expected value of effective nozzle area is computed based on parameter value indicator 204. Additionally, other operating condition information may be used to infer a desired parameter value indicator. More specifically, the maximum expected value represents the detection boundary. An estimate of the actual effective nozzle area is then calculated in estimator 206 using engine cycle data 212, including, for example, rotor speed, gas pressure or temperatures, engine power, altitude, Mach number, and fuel flow. The maximum expected value of the effective nozzle area and estimate of the actual effective nozzle area are compared at comparator 208, and an estimated effective area greater than the detection boundary results in a damage flag 210.

Effective area estimator 206 generates an estimated value of effective nozzle area as a function of engine cycle data 212. In the exemplary embodiment, the function is a simple linear function of the inputs. In an alternative embodiment, the function is a neural network. In another alternative embodiment, the function is a nonlinear function of the inputs. Additionally, estimator 206 may be trained using real or simulated engine data, of both damaged and undamaged engines 10. In yet another alternative embodiment, the function may be a physics-based model of an effective nozzle area that uses upstream parameters as inputs.

Similar logic, using a minimum expected value of effective nozzle area for the detection boundary, may be used to detect VEN or afterburner duct blockages or erroneous position feedback signals. During such conditions, the effective nozzle area is smaller than what would be expected based on the actuator position feedback value 204. Such logic may be used in conjunction with the "maximum area" logic described above, and such use is consistent with the intent and operation of both types of logic.

Figure 3:
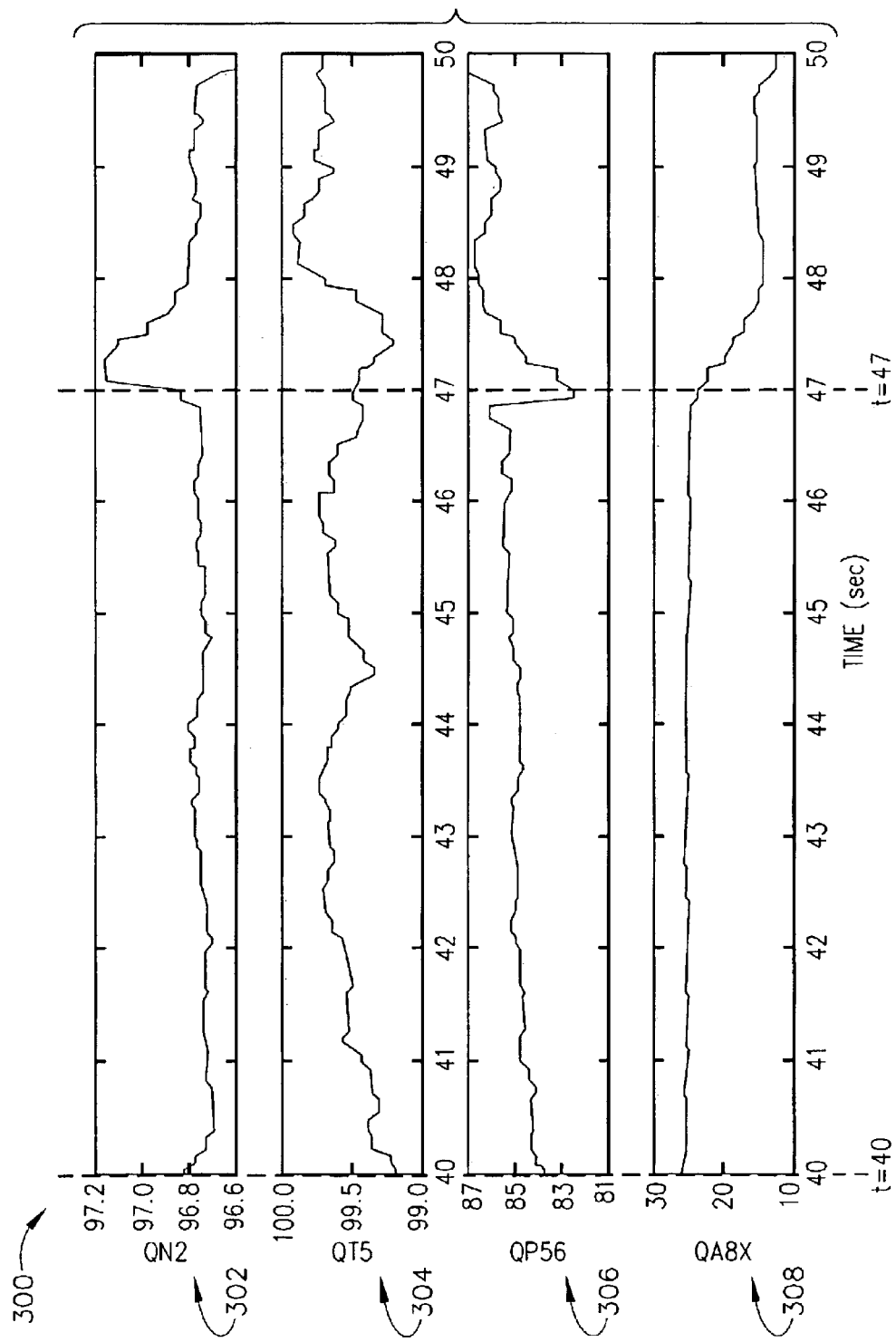
FIG. 3 is a graph illustrating exemplary traces of an engine test.

FIG. 3 is a graph 300 illustrating exemplary traces of an engine test wherein damage detector 200 is implemented in software for a military aircraft engine, available from General Electric Company, Cincinnati, Ohio. The test includes engine cycle data and engine test data. During the engine test, a pre-existing hole in the side of the afterburner duct section was exposed which resulted in increasing the effective area downstream of turbines 18 and 20. A first hole was exposed at partial power early in the test, prior to an elapsed time of forty (t=40) seconds. Accordingly, data shown in graph 300 represents a condition wherein the afterburner duct includes simulated pre-existing VEN damage. An additional hole was exposed from engine 10, near the rear of the afterburner section after engine 10 was brought to maximum dry power (IRP) and after approximately forty-seven (t=47) seconds had elapsed. Fan speed trace 302 illustrates a response of fan speed (QN2) to a sudden increase in effective nozzle area due to exposure of the second hole. LP turbine exit temperature (QT5) trace 304 illustrates the response of LP turbine exit temperature to the initial increase in fan speed 302. LP turbine exit pressure (QP56), as shown in trace 306, initially decreases in response to the increased exhaust area. Trace 308 illustrates a response of the exhaust nozzle actuator position feedback (QA8X). As the FADEC detects, and then compensates for the increased effective exhaust nozzle area, the control system commands the exhaust nozzle to close down. As the exhaust nozzle closes, it can be seen that fan speed, as shown in trace 302, LP turbine exit temperature, as shown in trace 304, and LP turbine exit pressure, shown in trace 306, return to values near their pre-event values. Notably, in the exemplary case, the simulated damage was not sufficient to exceed the limits of the capability of exhaust nozzle 28 to correct for the damage, and as such may have gone undetected until physical inspection was performed.

Figure 4:
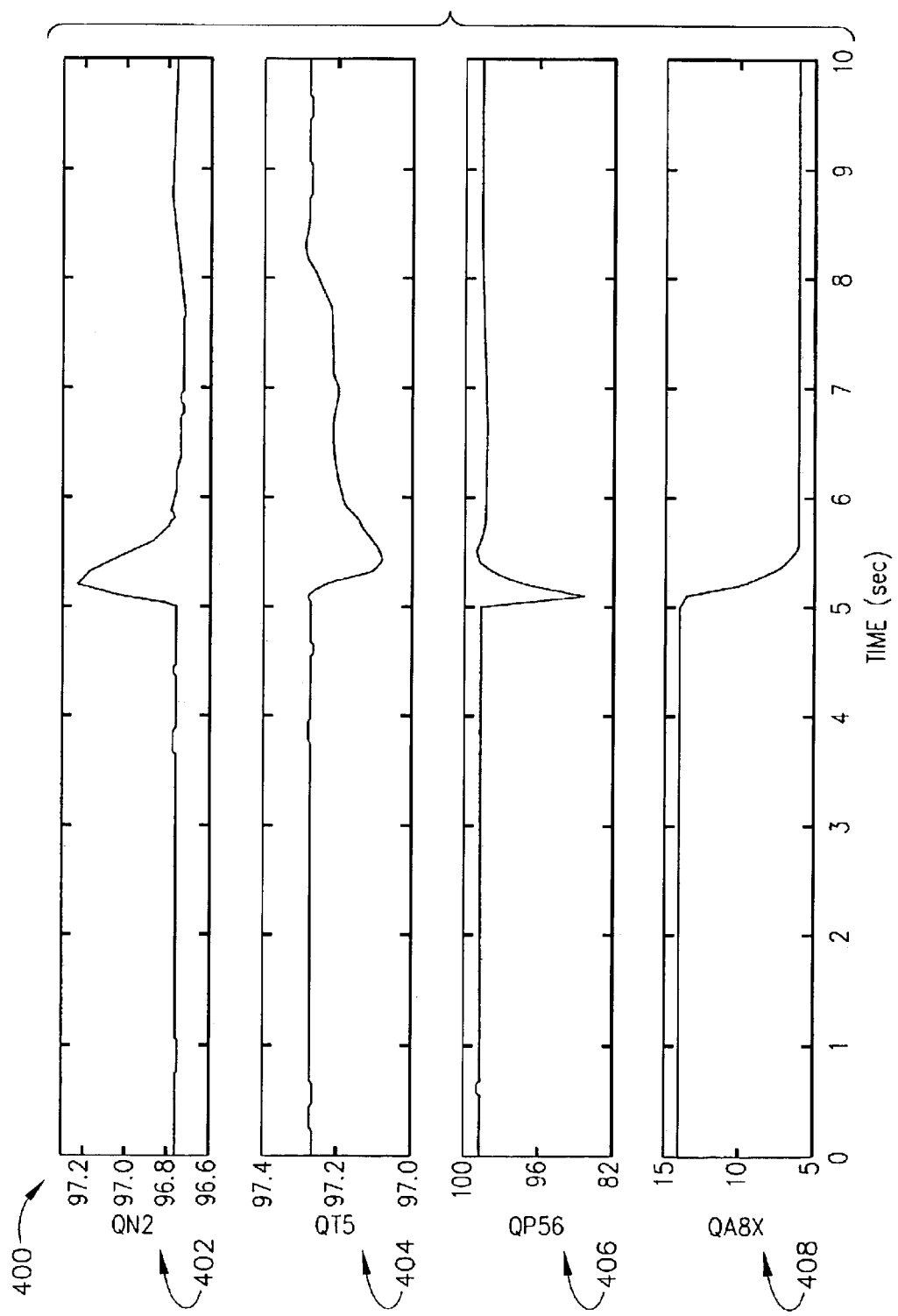
FIG. 4 is a graph illustrating exemplary traces of a computer simulation test of a hole in developed in the afterburner duct of the engine.

FIG. 4 is a graph 400 illustrating exemplary traces of a computer simulation test of a hole developed in the afterburner duct of engine 10. FIG. 4 illustrates the simulation results of injecting the equivalent of a 20 $in^2$ hole in the afterburner duct or nozzle area. The operating conditions are similar to those of the engine test shown in FIG. 3. The damage is injected at the five second mark (t=5), and the corresponding increase in fan speed illustrated in trace 402, and decrease in LP turbine exit temperature, illustrated in trace 404 and LP turbine exit pressure, illustrated in trace 406 are compensated for by a reduction in exhaust nozzle actual area, illustrated in trace 408, commanded by the FADEC.

Figure 5:
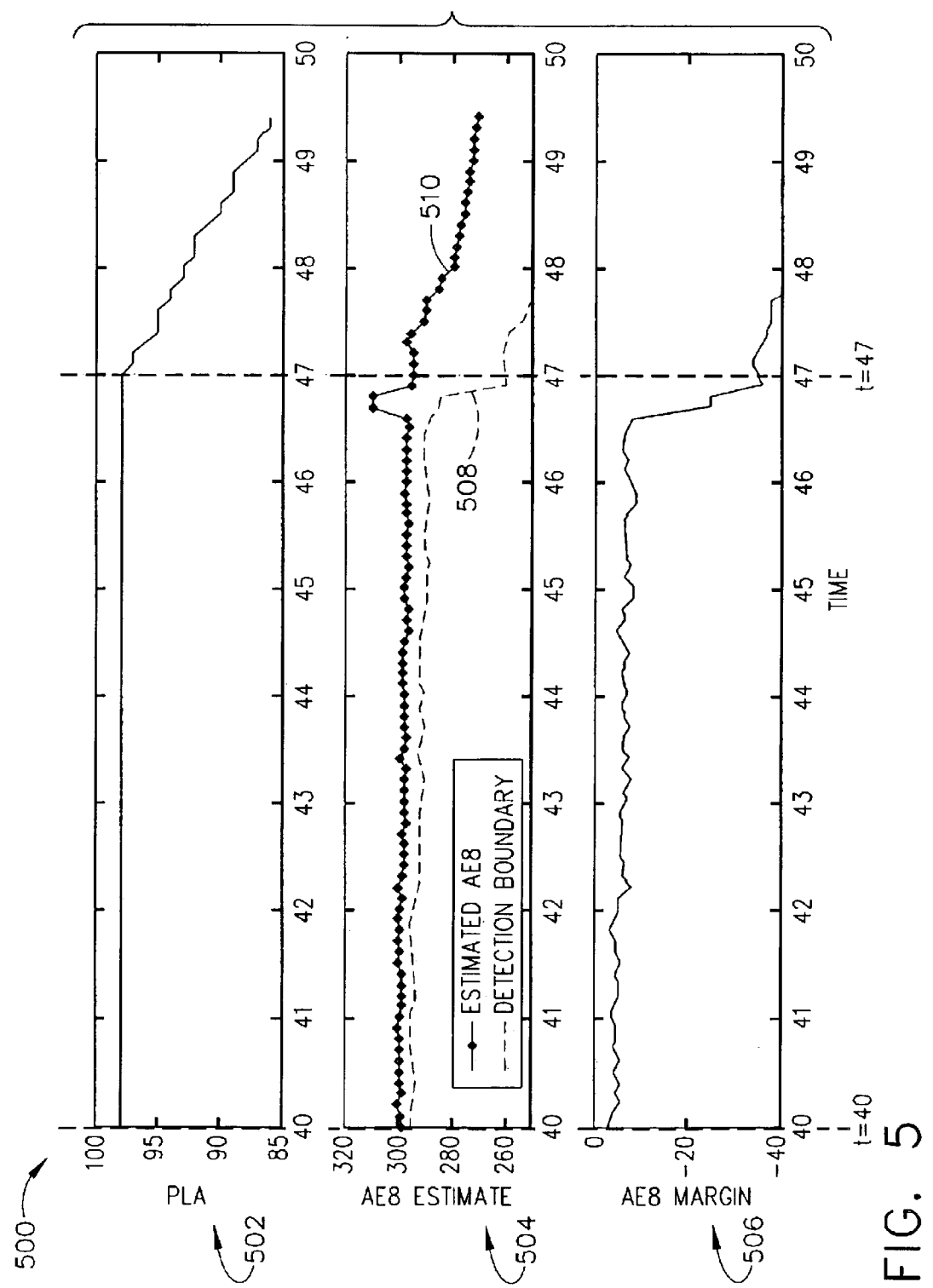
FIG. 5 is a graph illustrating exemplary traces of results of the damage detector for engine test data.

FIG. 5 is a graph 500 illustrating exemplary results of damage detector 200 for the engine test data. Graph 500 includes a throttle position (PLA) trace 502, an effective exhaust nozzle area (AE8) estimate trace 504, and an AE8 Margin trace 506. Trace 504 illustrates a detection boundary trace 508, which is a computed estimate of effective nozzle area based on A8 actuator position feedback. In the exemplary embodiment, detection boundary trace 508 includes additional margin built in. An estimated AE8 trace 510 is an estimate of effective nozzle area based on engine cycle data 212. At the beginning of the test (t=40), estimated AE8 trace 510 is greater than detection boundary trace 508 due to the exposure of first hole. However, at approximately the forty-seven second time mark (t=47), the second hole is exposed. Estimated AE8 trace 510 responds by increasing initially due to additional exhaust area provided by the hole. As the FADEC begins to compensate, AE8 estimate trace 510 and detection boundary trace 508 decrease. When the second hole is exposed, the difference between estimated AE8 trace 510 and detection boundary trace 508 changes by approximately 30 $in^2$ as illustrated by graph 506. AE8 Margin trace 506 illustrates the difference between AE8 Estimate trace 510 and detection boundary trace 508. In the exemplary embodiment, a signal represented by AE8 margin graph is used to set damage flag 210. In the case of a nozzle or afterburner duct blockage, AE8 estimate graph 506 would illustrate a trace acting in an opposite direction and the difference between estimated AE8 trace 510 and detection boundary trace 508 would increase in a positive reference direction.

Figure 6:
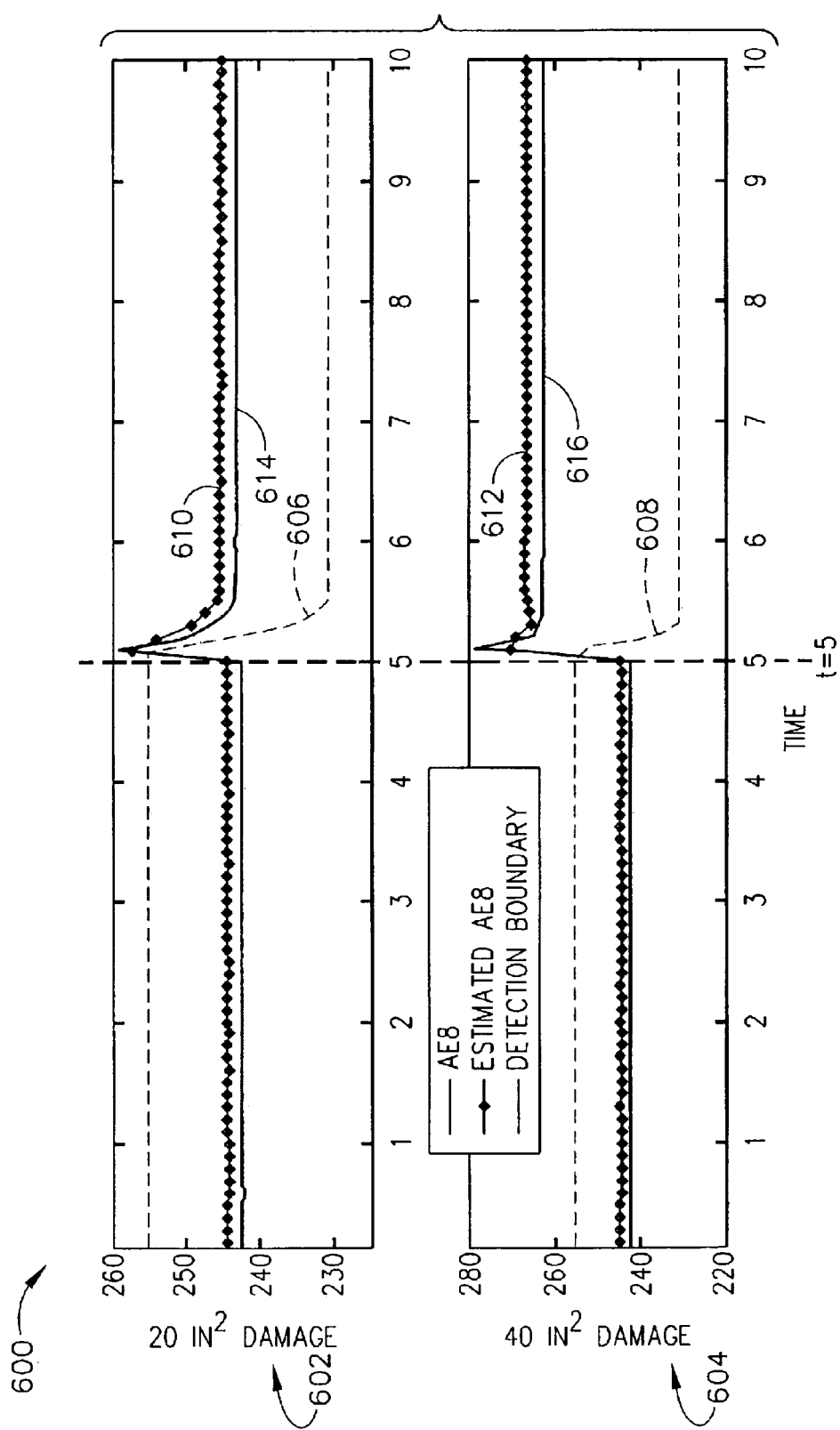
FIG. 6 is a graph illustrating exemplary traces of results of the damage detector as applied to simulation data.

FIG. 6 is a graph 600 of results of damage detector 200 applied to simulation data. Graph 600 illustrates a damage trace 602 that would result from a 20 $in^2$ hole and a damage trace 604 that would result from a 40 $in^2$ hole. Each of traces 602 and 604 include a Detection Boundary trace 606 and 608, an Estimated AE8 trace 610 and 612, and an AE8 trace 614 and 616. The simulation results show similar behavior as the engine test data shown in FIG. 5, except that the simulated pre-existing damage is not present, therefore Estimated AE8 trace 606, 608 is approximately equal to AE8 trace 614, 616. After an elapsed time of approximately five seconds during the simulation, damage to the engine corresponding to a 20 $in^2$ hole and a 40 $in^2$ hole is simulated as shown in traces 602 and 604 respectively. In each simulation, Estimated AE8 trace 610, 612 and AE8 trace 614, 616 increase sharply because the simulated damage presents a larger nozzle area permitting more flow through engine 10. The FADEC compensates for the increased flow through the engine by closing exhaust nozzle 28, reducing the nozzle area and restricting flow through engine 10.

Figure 7:
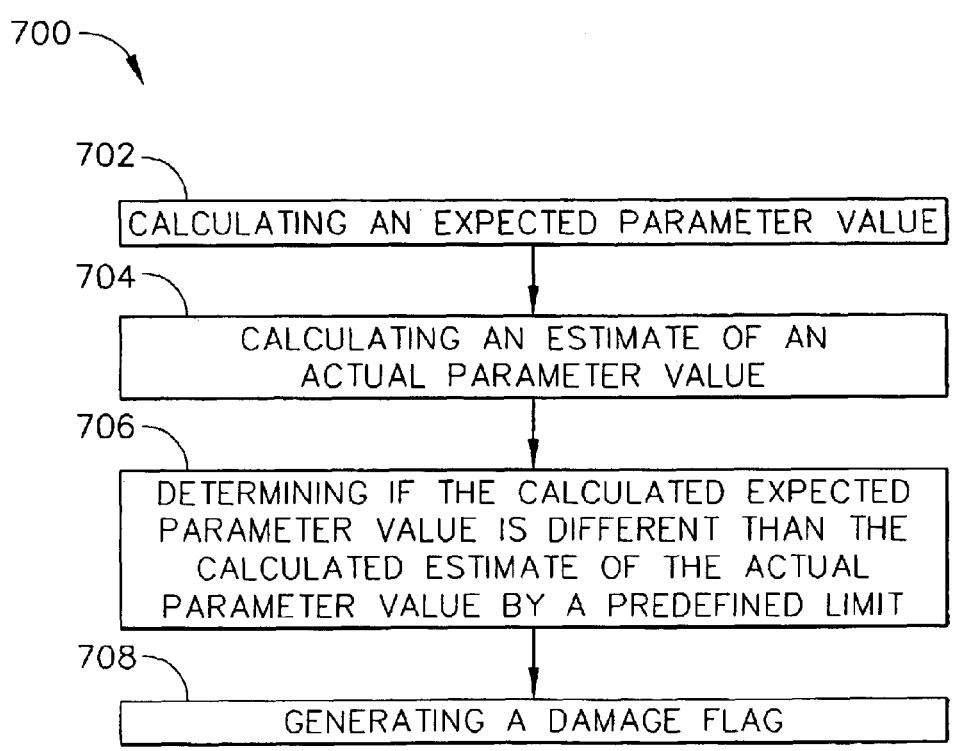
FIG. 7 is a process flow diagram for a damage assessment process of the damage detector shown in FIG. 2.

FIG. 7 is a process flow diagram for a damage assessment process 700 of the damage detector shown in FIG. 2. Process 700 calculates 702 an expected parameter value based on a first parameter value indicator 204, which is responsive to a damage symptom. In the exemplary embodiment, first parameter value indicator 204 is a position feedback signal for a gas turbine engine exhaust nozzle actuator. In an alternative embodiment, first parameter value indicator 204 may be any monitored parameter or parameter that may be inferred from other monitored parameters. The engine exhaust nozzle actuator position feedback signal may be selected because in one known damage scenario, such as, a hole in a wall of the engine afterburner duct, the engine FADEC compensates for the hole by causing the exhaust nozzle to close down. The position feedback signal indicates a repositioning of the nozzle in response to damage to the engine. An estimate of an actual parameter value is calculated 704 based on a second parameter value indicator. In the exemplary embodiment, the second parameter value indicated is a plurality of sensors monitoring machine parameters that may be combined to infer an estimate of the actual parameter value. In an alternative embodiment, the second parameter value indicated may be a redundant sensor monitoring the same parameter as the first parameter value indicator. The results of the calculated expected parameter value is compared 706 to the calculated estimate of the actual parameter value based on a predefined limit. If the results of the comparison exceed the limit, a damage flag is generated 708. Damage flag 708 may indicate a hole or otherwise excess flow condition, or may indicate a blockage of the afterburner duct or a faulty actuator position feedback. Damage flag 708 may be used to initiate automatic corrective action, signal a visual and/or sonic warning, write an entry to a fault log, or may be used in concert with other flags to diagnose and/or report engine problems to a supervisory control system and/or human operator.

The above-described damage detector system is cost-effective and highly reliable. Each system includes a detection boundary module that is communicatively coupled to a parameter value indicator, an effective area estimator to determine a nozzle area, and a comparator that receives signals from the detection boundary module and the estimator and compares the received signals relative to each other and to a predetermined limit. If a result of the comparison exceeds a limit value, a damage flag is generated. Accordingly, the damage detector system facilitates operation and maintenance of machines, and in particular gas turbine engines, in a cost-effective and reliable manner.

Exemplary embodiments of damage detector system components are described above in detail. The components are not limited to the specific embodiments described herein, but rather, components of each system may be utilized independently and separately from other components described herein. Each damage detector system component can also be used in combination with other damage detector system components.

While the invention has been described in terms of various specific embodiments, those skilled in the art will recognize that the invention can be practiced with modification within the spirit and scope of the claims.

What is claimed is:

1. A method of assessing damage to machine components, said method comprising:

calculating an expected parameter value based on a first parameter value indicator wherein the first parameter value indicator is responsive to a damage symptom;

calculating an estimate of an actual parameter value based on a second parameter value indicator wherein the second parameter value indicator is different than the first parameter value indicator and comprises calculating an estimate of an actual effective nozzle area using an estimator that computes at lease one of a linear function of the engine cycle data inputs, a neural network function of the engine cycle data inputs, and a nonlinear function of the engine cycle data inputs;

training the estimator using at least one of real engine data from an undamaged engine, real engine data from a damaged engine and simulated engine data from an undamaged engine, and simulated engine data from an undamaged engines;

determining if the calculated expected parameter value is different than the calculated estimate of the actual parameter value by a predefined limit; and generating a damage flag based on a result of the comparison.

2. A method of assessing damage to machine components, said method comprising:

calculating an expected parameter value based on a first parameter value indicator wherein the first parameter value indicator is responsive to a damage symptom;

calculating an estimate of an actual parameter value based on a second parameter value indicator wherein the second parameter value indicator is different than the first parameter value indicator and comprises calculating an estimate of an actual effective nozzle area using an estimator that computes at lease one of a linear function of the engine cycle data inputs, a neural network function of the engine cycle data inputs, and a nonlinear function of the engine cycle data inputs;

calculating an estimate of an actual effective nozzle area using an estimator that includes a physics-based model of effective nozzle area that includes upstream parameter value indicators as inputs;

determining if the calculated expected parameter value is different than the calculated estimate of the actual parameter value by a predefined limit; and generating a damage flag based on a result of the comparison.

* * * * *

UNITED STATES PATENT AND TRADEMARK OFFICE
CERTIFICATE OF CORRECTION

PATENT NO.   : 6,892,127 B2
DATED        : May 10, 2005
INVENTOR(S)  : Matthew William Wiseman It is certified that error appears in the above-identified patent and that said Letters Patent is hereby corrected as shown below:

Column 6,
Line 25, delete "lease" insert therefor -- least --.
Line 31, delete "damaged engine and" and insert therefor -- damaged engine, --.
Line 33, delete "undamaged" insert therefor -- damaged --.
Line 33, delete "engines" and insert therefor -- engine --.

Signed and Sealed this

Eleventh Day of October, 2005

JON W. DUDAS
*Director of the United States Patent and Trademark Office*